(No Model.)
C. LAVAL.
Combined Photograph and Mirror.
No. 242,336. Patented May 31, 1881.
Fig. 1.
Fig. 2.
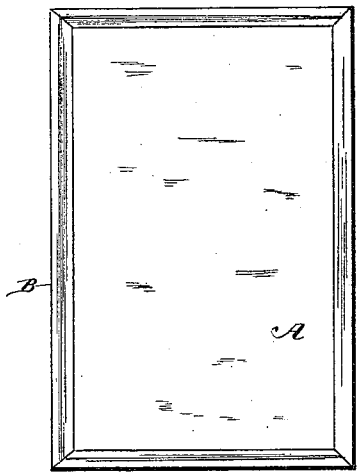
Fig. 3.
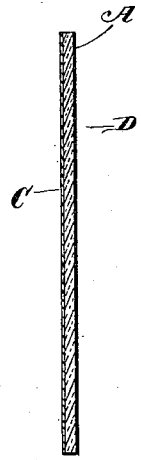
Witnesses.
Robt Everett,
J. A. Rutherford
Inventor.
Constant Laval.
By James L. Norris.
Atty.

UNITED STATES PATENT OFFICE.

CONSTANT LAVAL, OF NEW YORK, N. Y.

COMBINED PHOTOGRAPH AND MIRROR.

SPECIFICATION forming part of Letters Patent No. 242,336, dated May 31, 1881.

Application filed April 11, 1881. (No model.)

*To all whom it may concern:*

Be it known that I, CONSTANT LAVAL, a citizen of the United States, residing at New York, in the county of New York and State of New York, have invented new and useful Improvements in Combined Photograph and Mirror, of which the following is a specification.

My invention relates to photographing upon glass plates prepared as mirrors, its object being to utilize the same film or layer of silver for producing both a mirror and a photographic picture, the picture being taken upon one surface of the silver, the latter forming the background to the photograph, while the opposite surface of the silver is in direct contact with the glass and forms the reflecting-surface of the mirror, whereby I produce a mirror in which the reflecting-surface is entirely unobstructed, while the silver film is ornamented with the photograph.

In carrying out my invention I deposit upon a plate of glass of the desired thickness a suitable coat of silver to form a good reflecting-surface to show through said glass. I then cover the exposed surface of the silver with a thin varnish of white shellac dissolved in alcohol, floating the varnish upon the silver and then draining and allowing the silver face to dry. In preparing the thin prepared plate for taking a picture I form a collodion film upon the silver, and then treat the plate in any suitable sensitizing bath and expose it in a camera in the usual manner in taking photographic pictures, the subsequent steps being such as are well known and suitable in the arts.

By this method I obtain upon one surface of the silver film or coat a perfect photographic picture, the silver film constituting a backing to the same, while the opposite surface of the silver is in direct contact with the glass and forms an unobstructed reflecting-surface.

The glass is preferably surrounded by a frame, which should be finished on both sides; or the plate may be mounted in any desired manner, and constitutes a useful as well as a beautiful article.

In the accompanying drawings, Figure 1 shows the mirror-face; Fig. 2, the picture-face; and Fig. 3 is a vertical central section of a combined photograph and mirror made according to my invention.

The letter A denotes the glass plate encircled by a frame, B, which may be provided with an ornamental handle. One side, C, is coated with the silver and subjected to the photographic process, as described, and the other side, D, is a mirror-surface, the silver showing through the glass to give the same its brilliant reflecting property.

I do not claim, broadly, photographs on glass, as they have been made for a long time.

What I claim is—

1. A glass-mirror plate having a reflecting coating, upon the rear surface of which is formed a photographic picture, the reflecting coating constituting a background to the picture, substantially as described.

2. A glass-mirror plate having a silver reflecting coating, one surface of which is in contact with the glass, and the other or exposed surface prepared substantially in the manner described, to receive a photographic picture, as and for the purposes set forth.

In witness whereof I have hereunto set my hand in the presence of two subscribing witnesses.

CONSTANT LAVAL.

Witnesses:
 E. C. TWEEDY,
 CHR. YOOSS.